(12) United States Patent
Reilly et al.

(10) Patent No.: US 7,543,653 B2
(45) Date of Patent: Jun. 9, 2009

(54) DIAPHRAGM LATCH VALVE

(75) Inventors: William J. Reilly, Langhorne, PA (US);
Kevin J. Blease, Easton, PA (US);
Joseph K. Banis, Alpha, NJ (US)

(73) Assignee: Victaulic Company, Easton, PA (US)

( * ) Notice: Subject to any disclaimer, the term of this patent is extended or adjusted under 35 U.S.C. 154(b) by 489 days.

(21) Appl. No.: 11/172,353

(22) Filed: Jun. 30, 2005

(65) Prior Publication Data

US 2007/0000671 A1 Jan. 4, 2007

(51) Int. Cl.
*A62C 35/00* (2006.01)
(52) U.S. Cl. .............................. 169/17; 251/94; 251/95; 137/556
(58) Field of Classification Search ................. 239/570, 239/569, 581.1; 169/17, 56, 22, 21, 20, 19, 169/23, 16; 251/94, 95, 114, 66, 73, 74, 251/97; 137/556, 527
See application file for complete search history.

(56) References Cited

U.S. PATENT DOCUMENTS

| | | | | | |
|---|---|---|---|---|---|
| 1,689,980 | A | * | 10/1928 | Tyden | 169/22 |
| 1,759,158 | A | * | 5/1930 | Hamilton | 169/17 |
| 1,790,467 | A | * | 1/1931 | Griffith | 169/22 |
| 1,869,202 | A | * | 7/1932 | Lowe et al. | 169/17 |
| 1,942,822 | A | * | 1/1934 | Lowe et al. | 169/17 |
| 2,027,051 | A | * | 1/1936 | Lowe et al. | 169/17 |
| 2,047,719 | A | * | 7/1936 | Wallace et al. | 169/21 |
| 2,558,176 | A | * | 6/1951 | Gieseler | 169/19 |
| 2,713,916 | A | * | 7/1955 | Muckenfuss | 169/19 |
| 2,822,052 | A | * | 2/1958 | Herkimer | 169/19 |
| 3,307,633 | A | * | 3/1967 | Newall | 169/22 |
| 3,595,318 | A | * | 7/1971 | Merdinyan | 169/17 |
| 3,759,331 | A | * | 9/1973 | Livingston | 169/17 |
| 5,295,503 | A | | 3/1994 | Meyer et al. | |
| 5,439,028 | A | * | 8/1995 | Meyer et al. | 137/556 |
| 5,794,655 | A | * | 8/1998 | Funderburk et al. | 137/527 |
| 6,000,473 | A | * | 12/1999 | Reilly | 169/17 |
| 6,029,749 | A | * | 2/2000 | Reilly et al. | 169/17 |
| 6,068,057 | A | * | 5/2000 | Beukema | 169/22 |
| 6,293,348 | B1 | | 9/2001 | Reilly | |
| 6,536,533 | B2 | | 3/2003 | Reily | |

(Continued)

OTHER PUBLICATIONS

Victaulic, Series 751 FireLock Alarm Check Valve, IPS Carbon Steel Pipe Fire Protection Products 10.30, Jul. 2002, pp. 1-8.

*Primary Examiner*—Len Tran
*Assistant Examiner*—Trevor E McGraw
(74) *Attorney, Agent, or Firm*—Ballard Spahr Andrews and Ingersoll, LLP

(57) ABSTRACT

A valve for fire suppression sprinkler systems is disclosed. The valve has a chamber with an inlet and an outlet. A closure member, positioned within the chamber, is movable to close and open the inlet. A latch engages the closure member to hold it in the closed position. The latch also engages a deformable diaphragm. The diaphragm deforms in response to pressure applied to it and allows the latch to move between a latched position engaged with the closure member and an unlatched position away from the closure member. When the diaphragm is depressurized it allows the latch to move and disengage from the closure member, which opens under fluid pressure from the inlet and allows fluid to flow through the valve.

19 Claims, 4 Drawing Sheets

U.S. PATENT DOCUMENTS

| | | | |
|---|---|---|---|
| 6,666,277 B2 * | 12/2003 | Reilly ......................... | 169/16 |
| 6,708,771 B2 * | 3/2004 | Reilly ......................... | 169/16 |
| 6,752,217 B2 | 6/2004 | Reilly | |
| 2002/0011342 A1 * | 1/2002 | Reilly ......................... | 169/16 |
| 2002/0121381 A1 * | 9/2002 | Reilly ......................... | 169/14 |
| 2005/0155777 A1 * | 7/2005 | Reilly et al. .................. | 169/16 |

* cited by examiner

DIAPHRAGM LATCH VALVE

FIELD OF THE INVENTION

This invention relates to valves used to control fluid flow, and especially to valves used in fire suppression sprinkler systems.

BACKGROUND OF THE INVENTION

Automatic sprinkler systems for fire protection of structures such as office buildings, warehouses, hotels, schools and the like are required when there is a significant amount of combustible matter present in the structure. The combustible matter may be found in the materials from which the building itself is constructed, as well as in the building contents, such as furnishings or stored goods.

FIG. 1 shows a schematic diagram of a fire suppression sprinkler system 10 comprising sprinkler heads 12 attached to a piping network 14 that extends through the structure (not shown) to be protected. Piping network 14 is connected to a source of pressurized water 16 or other fire suppressing fluid through a control valve 18. An actuator 20 controls the opening of valve 18 in response to changes in one or more physical parameters indicative of a fire, such as a pressure change within the piping network, or a temperature rise within the structure as described below. Various types of actuators may be used, such as those disclosed in U.S. Pat. Nos. 6,378,616, 6,666,277 and 6,708,771, all of which are hereby incorporated by reference.

The fire suppression system 10 described herein may be of any type, but the dry system is preferred as it finds widespread and effective use. Dry systems use the actuator 20, which responds to one or more signals from different detectors to open the valve 18 and provide water to the piping network 14. Similar to the so-called "deluge" or "pre-action" systems, prior to actuation, the piping network 14 is normally filled with pressurized air or nitrogen from a source of pressurized gas 22, such as a compressor or gas tanks. The dry system can thus be used in unheated environments which are subject to below freezing temperature without fear of pipes bursting due to water within the pipes expanding upon freezing.

When sufficiently pressurized, the behavior of the gas within the piping network may be used to indicate a fire condition and trigger actuation of the dry system. Heat from the fire will cause sprinkler heads to open, allowing pressurized gas to escape from the piping network and result in a pressure drop within the system. The actuator 20 is connected to the piping network by a conduit 24, which allows the actuator to sense the pressure drop and trigger the system by opening valve 18 in response. The actuator may also require an additional, independent signal indicative of a fire, such as a signal from a temperature sensor 26, before it opens valve 18. Such systems are known as double interlock preaction systems, and are advantageous because they prevent unintentional discharge of water due to failure, breakage or accidental opening of a sprinkler head.

FIG. 2 shows a control valve 28 according to the prior art, used with fire suppression sprinkler systems. Valve 28 has an inlet 30 connected to the pressurized water source 16 and an outlet 32 connected to the piping network 14. A clapper 34 is pivotally mounted within the valve. Pivoting motion of the clapper opens and closes the inlet controlling the flow of fluid to the system. When the inlet is pressurized, the clapper will open in response to the pressure and, therefore, must be held closed by a latch 36 pivotally mounted within the valve. Latch 36 is held in engagement with the clapper 34 by a piston 38 reciprocably movable within a cylinder 40. Piston 38 is preferably biased by a spring 42 to move away from and release latch 36, but the piston is held engaged with the latch by water pressure provided by a conduit 44 connecting the inlet to the cylinder. A conduit 46 connects the cylinder 40 to the actuator 20. When the actuator receives signals indicative of a fire, it releases the pressure within cylinder 40, allowing the piston 38 to move under the biasing force of spring 42 and release latch 36. This allows clapper 34 to open and provide water to the piping network 14. Note that spring 42 may be omitted if the geometries of the clapper 34 and the latch 36 relative to one another and their axes of rotation are such that water pressure in inlet 30, acting on the clapper, will pivot the latch and drive the piston 38 into the cylinder 40 in the absence of sufficient counteracting pressure within the cylinder.

Control valves 28 according to the prior art suffer a disadvantage in that they are complicated and expensive to manufacture and maintain. There is clearly a need for a simpler valve design with fewer moving parts that may be used in fire suppression systems.

SUMMARY OF THE INVENTION

The invention concerns a valve for controlling fluid flow. The valve comprises a chamber having an inlet and an outlet and a closure member movably mounted within the chamber. The closure member is movable between a closed position blocking the inlet, and an open position away from the inlet. The chamber has a flexible diaphragm that is deformable in response to fluid pressure applied to it. A latch is movably mounted within the chamber. The latch has a first portion engageable with the diaphragm and a second portion engageable with the closure member. The latch is engaged with the closure member by the diaphragm deforming in response to the fluid pressure. The latch maintains the closure member in the closed position as long as there is pressure applied to the diaphragm deforming it. The latch moves out of engagement with the closure member upon deformation of the diaphragm in response to a release of the pressure against it, thereby allowing the closure member to move into the open position.

Preferably the valve comprises a second chamber. The diaphragm forms a fluid tight interface between the first and second chambers. Pressure is applied to the diaphragm by pressurizing the second chamber.

The valve may also include an actuator in fluid communication with the second chamber. The actuator pressurizes and depressurizes the second chamber in response to a predetermined signal, for example, a signal indicative of a fire condition.

The invention also includes a fire suppression sprinkler system. The system comprises a plurality of sprinkler heads in fluid of communication with a piping network. A source of pressurized water is also in fluid communication with the piping network through a control valve as described above. The system further includes an actuator that controls the pressurization of the diaphragm for opening the valve in response to one or more signals indicative of a fire condition.

DETAILED DESCRIPTION OF THE EMBODIMENTS

Figure 1:
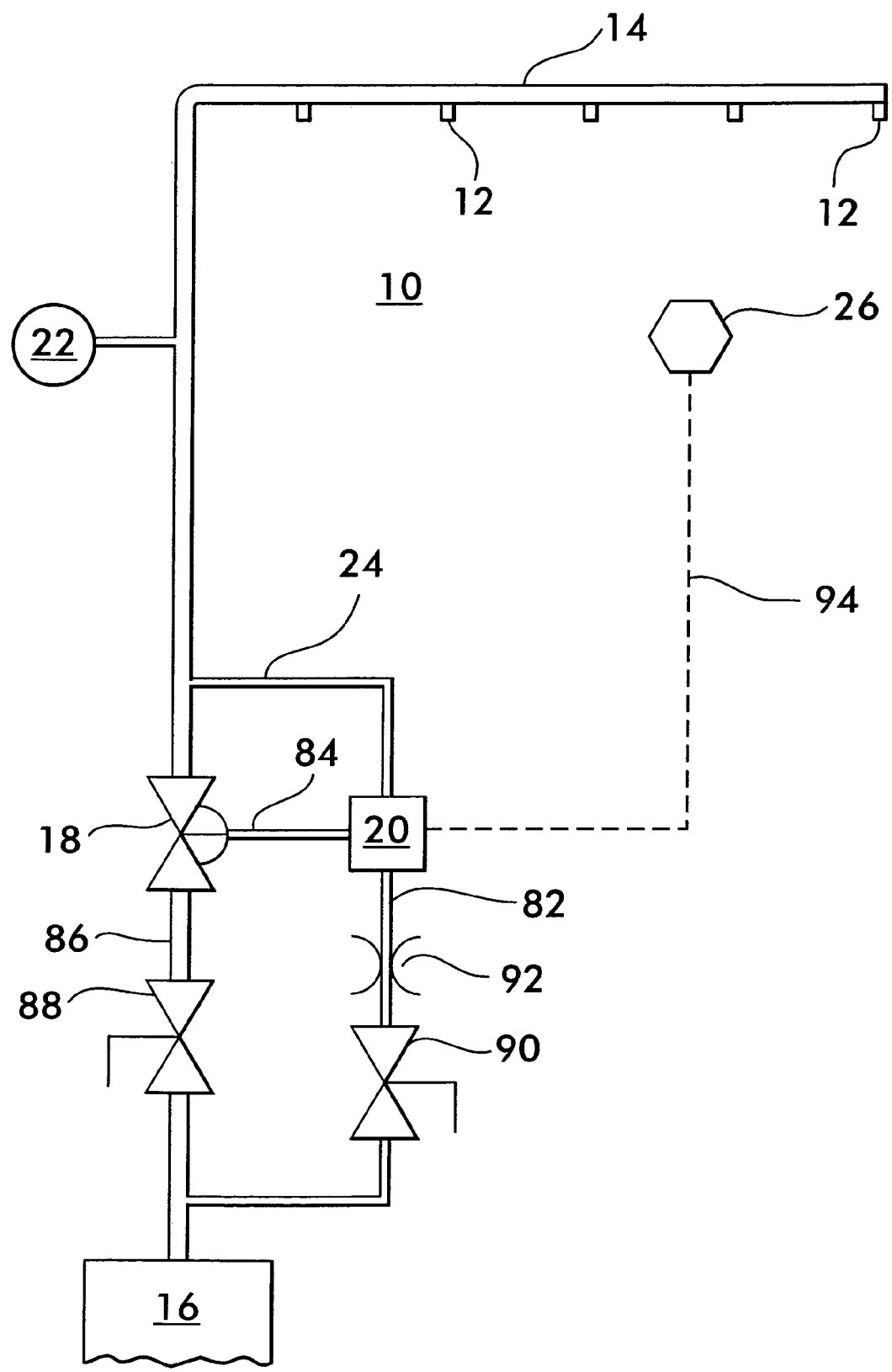
FIG. 1 is a schematic view of a sprinkler system for fire suppression.
Figure 2:
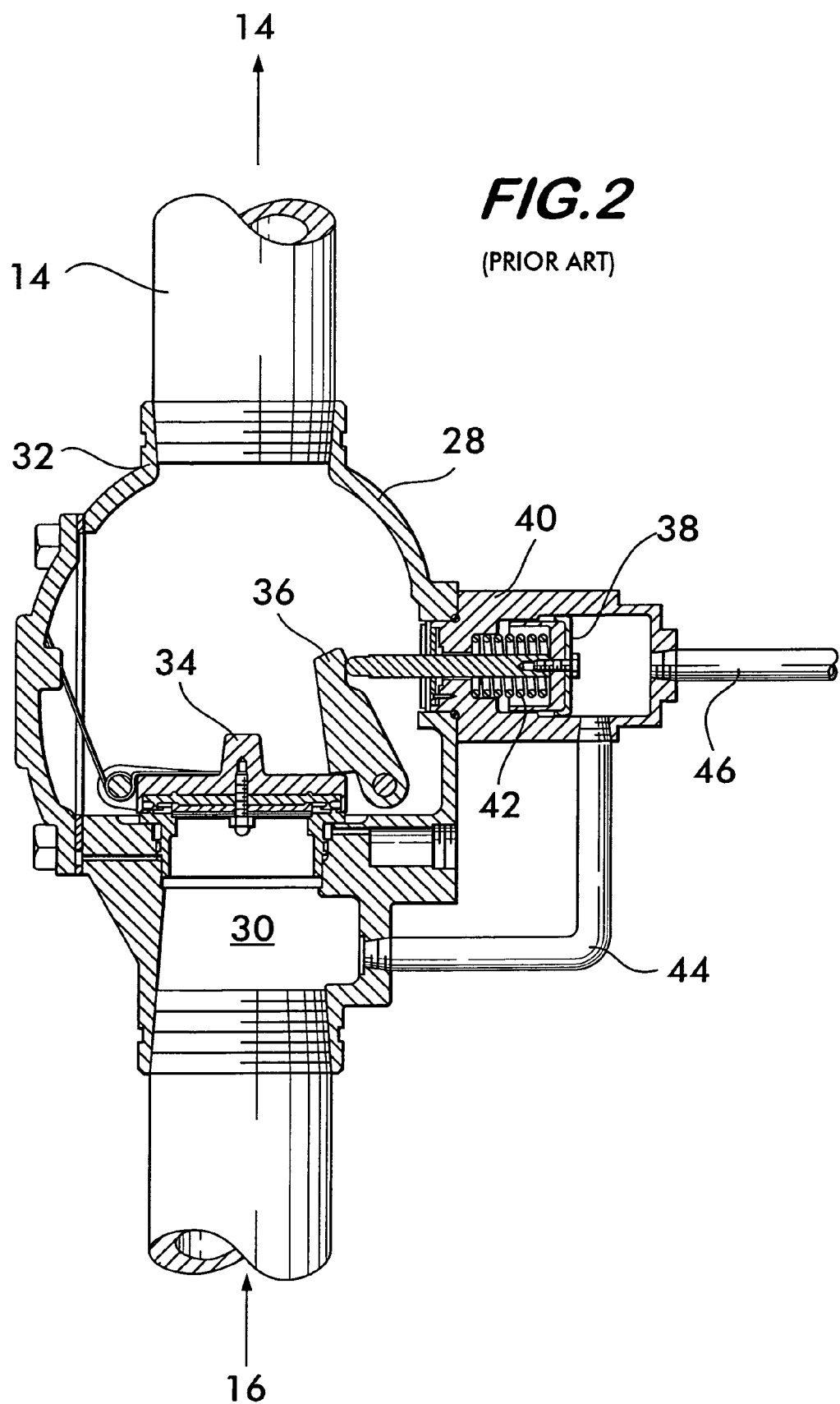
FIG. 2 is a longitudinal sectional view of a piston latch valve according to the prior art.
Figure 3:
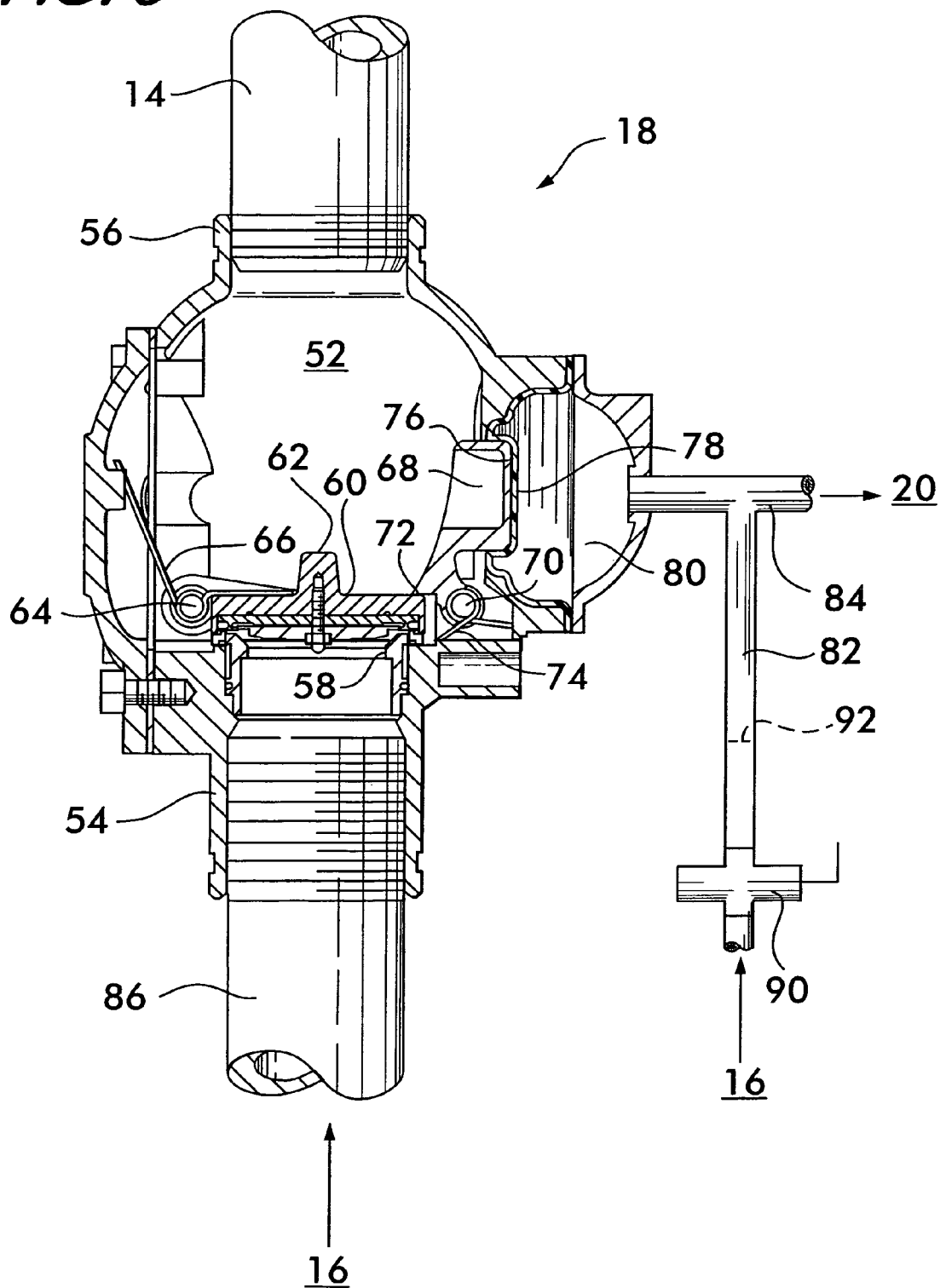
FIG. 3 is a longitudinal sectional view of the diaphragm latch valve according to the invention, the valve being shown in a closed position.
Figure 4:
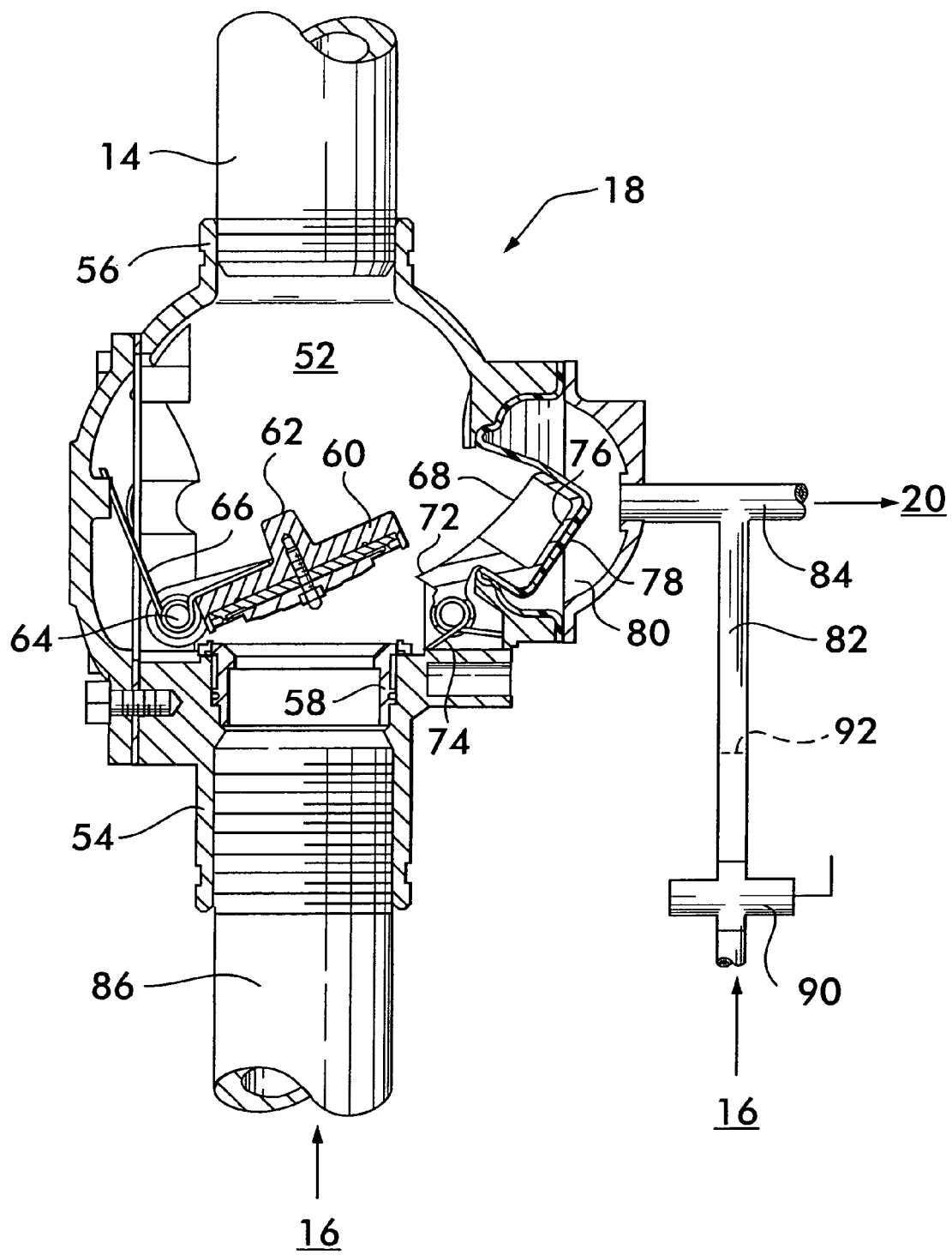
FIG. 4 is a longitudinal sectional view of the diaphragm latch valve shown in FIG. 3 but in an open position.

FIG. 3 shows a control valve 18 according to the invention used with the fire suppression sprinkler system 10 shown in FIG. 1. Valve 18 comprises a chamber 52 having an inlet 54 connectable to the source of pressurized water 16, and an outlet 56 connectable to the piping network 14. A seat 58 surrounds the inlet 54. A valve closure member 60 is movably positioned within the chamber 52. Preferably, the valve closure member comprises a clapper 62 that is pivotably mounted for rotation about an axis 64. Clapper 62 is pivotable between a closed position, shown in FIG. 3, where it engages seat 58 and blocks inlet 54, and an open position, pivoted away from the seat and the inlet, as shown in FIG. 4.

Clapper 62 is preferably biased into the closed position by a spring 66, the spring being sufficiently stiff so as to pivot the clapper into engagement with the seat 58 in the absence of water pressure within the inlet, the spring otherwise allowing the clapper to open in response to water pressure within the inlet. The spring biasing of clapper 62 is advantageous for resetting the valve as described in detail below.

A latch 68 is also movably positioned within the chamber 52. Latch 68 is preferably pivotable about an axis 70 and has a shoulder 72 engageable with the clapper 62. Latch 68 is movable between a latched position, shown in FIG. 3, where shoulder 72 engages clapper 62, and an unlatched position, shown in FIG. 4, where the latch is pivoted away from and out of engagement with the clapper. Preferably, latch 68 is biased into the unlatched position by a biasing spring 74 as explained below.

Latch 68 has a face 76 that engages a flexible diaphragm 78. Diaphragm 78 is preferably formed of fabric reinforced rubber and is designed to withstand a minimum pressure of 600 psi sustained for two hours. The diaphragm preferably forms a fluid tight interface between chamber 52 and a second, smaller chamber 80. The second chamber 80 allows the diaphragm to be conveniently pressurized and de-pressurized. This pressurization and depressurization deforms the diaphragm which pivots the latch between the latched and unlatched positions to either maintain the clapper in the closed position or release it so that it may pivot into the open position.

Preferably, chamber 80 is pressurized by water from the pressurized water source 16 through a conduit 82 connecting the source to the chamber. The chamber is also in fluid communication with actuator 20 through a conduit 84 (see also FIG. 1). Control of the valve 18 is effected through the actuator 20 as described below in the context of system operation.

Valve 18, as part of the fire suppression sprinkler system 10 shown in FIG. 1, is connected to the pressurized water source 16 by a conduit 86. A valve 88 is positioned in conduit 86 between the source and the control valve 18 to allow the control valve to be set into a ready condition as described below. Conduit 82 is connected to conduit 86 between the valve 88 and the source 16. A valve 90 is positioned within conduit 82 between the source 16 and the second chamber 80. Valve 90 is used to pressurize chamber 80 when setting valve 18 to the ready condition. Conduit 82 also has a restricting element 92 that limits the flow of water from the source 16 to the chamber to ensure proper operation of the valve 18 as described below.

Valve 18 is set to the ready condition, illustrated in FIG. 3, by first closing valves 88 and 90 (see also FIG. 1) and then draining any water from the valve and the piping network 14 through drain ports in the valve (not shown). Closure of valve 88 removes water pressure from the valve inlet 54 and allows the clapper 62 to move to the closed position shown under the force of biasing spring 66. The use of biasing spring 66 allows the valve to close itself automatically in the absence of inlet pressure. This is convenient when the system is reset after it is triggered, as it is not necessary to manually close the clapper. Note that latch 68 is biased by spring 74 into the unlatched position to allow the clapper to close unimpeded. Once the clapper is closed the valve 90 is opened. This allows water to flow from pressurized source 16 through conduit 82 into chamber 80, pressurizing the chamber and deforming the diaphragm 78. Deformation of the diaphragm by the applied pressure pivots the latch 68 into the latched position (shown). Upon pivoting of the latch the shoulder 72 engages the clapper. Valve 88 is then opened, thereby pressurizing the inlet 54. The latch shoulder 72, engaged with the clapper, holds it closed against the inlet pressure. The valve 18 is thus in the ready condition. The inlet pressure is also communicated to actuator 20 by conduit 84. The piping network 14, drained of any water, is pressurized with a gas from source 22, and the gas pressure of the network is communication to the actuator by conduit 24. Additional sensors 26, if present, are also activated, and the system 10 is in the ready mode.

If a fire condition occurs in the vicinity of one or more of the sprinkler heads 12 the heads open, allowing pressure in the network 14 to drop. If present, sensors 26 also detect the presence of the fire, for example, by a rise in temperature or the presence of combustion gases. The pressure drop in piping network 14 is communicated to the actuator 20 through conduit 24, and other signals from sensors 26 are transmitted to the actuator as well through communication lines 94. The actuator 20 receives the information conveyed by the downstream pressure drop and the sensor signals and determines whether an actual fire condition exists. If the parameters indicate the presence of a fire, the actuator 20 depressurizes chamber 80 by allowing the water to flow from it through conduit 84 faster than water can be supplied from the pressurized water source 16 through conduit 82. The restricting orifice 92 in conduit 82 provides for a reduce flow rate through the conduit, ensuring that water flows out from the chamber 80 when depressurized by the actuator.

As shown in FIG. 4, depressurization of chamber 80 allows diaphragm 78 to deform. The clapper 62, being exposed to the pressure from source 16, exerts a force on shoulder 72 of the latch 68. Because the shoulder is offset from the latch pivot axis 70, a torque is generated which pivots the latch into the unlatched position. Diaphragm 78, no longer pressurized, deforms into chamber 80 and permits the latch to pivot. Upon pivoting of the latch 68, the shoulder 72 disengages from the clapper 62 which, now substantially unconstrained, pivots from the closed to the open position allowing water to flow from the source 16 to the piping network 14 where it is discharged through open sprinkler heads 12.

Control valves according to the invention that use a deformable diaphragm for valve actuation provide a simple valve design with fewer moving parts that requires less maintenance and is more economical to manufacture.

What is claimed is:

1. A valve for controlling fluid flow, said valve comprising:
a first chamber having an inlet and an outlet;
a closure member movably mounted within said chamber, said closure member being movable between a closed position blocking said inlet, and an open position away from said inlet;
a flexible diaphragm deformable in response to fluid pressure applied against said diaphragm; and
a second chamber, wherein said diaphragm forms a fluid tight interface between said first and second chambers; wherein
a latch is movably mounted within said first chamber, said latch having a first portion in direct contact with said diaphragm and a second portion engageable with said closure member, said latch being engaged with said closure member by said diaphragm deforming in response to said fluid pressure and thereby maintaining said closure member in said closed position, said latch moving out of engagement with said closure member upon deformation of said diaphragm in response to a release of said fluid pressure thereby allowing said closure member to move into said open position.

2. A valve according to claim 1, further comprising an actuator in fluid communication with said second chamber, said actuator pressurizing and depressurizing said second chamber in response to a predetermined signal.

3. A valve for controlling fluid flow, said valve comprising:
a first chamber having an inlet and an outlet;
a closure member positioned within said first chamber, said closure member being movable between a closed position blocking said inlet, and an open position away from said inlet;
a second chamber having a flexible diaphragm, said diaphragm comprising a fluid tight interface between said first and second chambers, said diaphragm being deformable upon pressurization and depressurization of said second chamber; and
a latch movably positioned within said first chamber, said latch having a first portion engageable with said diaphragm and a second portion engageable with said closure member, said diaphragm deforming and moving said latch into engagement with said closure member and thereby maintaining said closure member in said closed position when said second chamber is pressurized, said diaphragm deforming and allowing said latch to move out of engagement with said closure member when said second chamber is depressurized thereby allowing said closure member to move into said open position.

4. A valve according to claim 3, wherein said closure member is pivotably movable between said open and said closed positions.

5. A valve according to claim 4, comprising a biasing element biasing said closure member into said closed position.

6. A valve according to claim 3, wherein said latch is pivotably movable between a first position engaging said closure member and a second position disengaged from said closure member.

7. A valve according to claim 6, comprising a biasing element biasing said latch into said position disengaged from said closure member.

8. A valve for controlling fluid flow, said valve comprising:
a first chamber having an inlet and an outlet;
a closure member pivotally mounted within said first chamber, said closure member being movable between a closed position blocking said inlet, and an open position pivoted away from said inlet;
a second chamber having a flexible diaphragm, said diaphragm being positioned between said first and second chambers, said diaphragm being deformable upon pressurization and depressurization of said second chamber; wherein said diaphragm forms a fluid tight interface between said first and second chambers; and
a latch is pivotably mounted within said first chamber, said latch having a first portion engageable with said diaphragm and a second portion engageable with said closure member, said latch engaging and maintaining said closure member in said closed position when said second chamber is pressurized, said latch moving out of engagement with said closure member when said second chamber is depressurized thereby allowing said closure member to move into said open position.

9. A valve according to claim 8, further comprising a conduit extending between said inlet and said second chamber, said conduit pressurizing said second chamber to a pressure substantially the same as pressure in said inlet.

10. A valve according to claim 8, further comprising an actuator in fluid communication with said second chamber, said actuator pressurizing and depressurizing said second chamber in response to a predetermined signal indicative of a fire condition.

11. A valve according to claim 10, wherein said signal comprises a pressure change within said actuator.

12. A valve according to claim 8, further comprising a biasing element biasing said closure member into said closed position.

13. A valve according to claim 12, wherein said biasing element comprises a spring engaging said closure member.

14. A valve according to claim 8, further comprising a biasing element biasing said latch out of engagement with said closure member.

15. A valve according to claim 14, wherein said biasing element comprises a spring engaging said latch.

16. A fire suppression sprinkler system comprising:
a plurality of sprinkler heads;
a piping network in fluid communication with said sprinkler heads;
a source of pressurized water in fluid communication with said piping network;
a valve in fluid communication with said piping network and said pressurized water source, said valve controlling fluid flow to said sprinkler heads and comprising:
a first chamber having an inlet and an outlet;
a closure member positioned within said first chamber, said closure member being movable between a closed position blocking said inlet, and an open position away from said inlet;
a flexible diaphragm deformable in response to fluid pressure applied against said diaphragm;
a second chamber, wherein said diaphragm forms a fluid tight interface between said first and second chambers;
a latch movably mounted within said first chamber, said latch having a first portion in direct contact with said diaphragm and a second portion engageable with said closure member, said latch being engaged with said closure member by said diaphragm deforming in response to said fluid pressure and thereby maintaining said closure member in said closed position, said latch moving out of engagement with said closure member upon deformation of said diaphragm in response to a release of said fluid pressure thereby allowing said closure member to move into said open position; and an actuator controlling pressurization of said diaphragm for opening said valve in response to a parameter indicative of a fire condition.

17. A sprinkler system according to claim 16, wherein said valve further comprises a second chamber, said diaphragm forming a fluid tight interface between said first and second chambers.

18. A sprinkler system according to claim 17, further comprising a conduit providing fluid communication between said pressurized water source and said second chamber, said conduit pressurizing said second chamber with water from said pressurized water source.

19. A sprinkler system according to claim 17, further comprising a conduit extending between said piping network and said actuator, said piping network being pressurized with a gas, said actuator depressurizing said second chamber in response to a decrease in gas pressure within said piping network.

* * * * *